(12) United States Patent
Schiller

(10) Patent No.: US 11,619,746 B2
(45) Date of Patent: Apr. 4, 2023

(54) SYSTEMS AND METHODS FOR INTERSENSOR SATELLITE CALIBRATION

(71) Applicant: Raytheon Company, Waltham, MA (US)

(72) Inventor: Stephen J. Schiller, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 141 days.

(21) Appl. No.: 17/178,540

(22) Filed: Feb. 18, 2021

(65) Prior Publication Data

US 2022/0260725 A1 Aug. 18, 2022

(51) Int. Cl.
| | |
|---|---|
| *G01S 19/00* | (2010.01) |
| *G01S 19/23* | (2010.01) |
| *B64C 39/02* | (2023.01) |
| *G01S 19/26* | (2010.01) |
| *G08G 5/00* | (2006.01) |

(52) U.S. Cl.
CPC .......... *G01S 19/235* (2013.01); *B64C 39/024* (2013.01); *G01S 19/26* (2013.01); *G08G 5/0013* (2013.01); *B64C 2201/122* (2013.01)

(58) Field of Classification Search
CPC ..... G01S 19/235; G01S 19/26; B64C 39/024; B64C 2201/122; G08G 5/0013
See application file for complete search history.

(56) References Cited

U.S. PATENT DOCUMENTS 8,158,929 B2 4/2012 Schiller
8,507,843 B2 8/2013 Silny et al.
(Continued)

FOREIGN PATENT DOCUMENTS

| CA | 2897803 C | * | 3/2020 | .......... G01S 13/955 |
| CN | 107219497 A | * | 9/2017 | .............. G01S 3/781 |

OTHER PUBLICATIONS

Fox et al., "Traceable radiometry underpinning terrestrial- and helio-studies (TRUTHS)"; Proc. SPIE 4881; Sensors, Systems, and Next-Generation Satellites VI; 2003.
(Continued)

*Primary Examiner* — Khai M Nguyen
(74) *Attorney, Agent, or Firm* — Burns & Levinson, LLP; Joseph M. Maraia

(57) ABSTRACT

An apparatus and method of intersensor calibration including using a zero airmass response constant proportional to sensor absolute radiometric gain coefficients to monitor sensor radiometric stability. Tracking the ratio of zero airmass response constant values for similar bands between two sensors provides a parameter on a common radiometric scale for evaluating interoperability performance. The method includes imaging a solar signal using a mirror to create an image reference target, detecting the image reference target using a first sensor, generating a zero airmass response constant based on a ground sampling distance of the first sensor and an at-sensor radiance value, computing a radiometric gain coefficient of the first sensor using the zero airmass response constant, and comparing the radiometric gain coefficient of the first sensor to a radiometric gain coefficient of a second sensor to determine a gain ratio between the first sensor and second sensor.

20 Claims, 8 Drawing Sheets

(56) References Cited

U.S. PATENT DOCUMENTS

| | | |
|---|---|---|
| 9,068,886 B2 | 6/2015 | Silny et al. |
| 9,823,116 B2 | 11/2017 | Silny et al. |
| 2010/0032557 A1* | 2/2010 | Schiller .................... G01J 5/02 |
| | | 250/252.1 |
| 2019/0258899 A1* | 8/2019 | Coogan ................ G06V 20/188 |

OTHER PUBLICATIONS

Goldberg et al., "The global space-based inter-calibration system." Bulletin of the American Meteorological Society 92.4 (2011); 467-475.

Teillet et al., "Earth observation sensor calibration using a global instrumented and automated network of test sites (GIANTS)"; Proc. SPIE vol. 4540; Sensors, Systems, and Next-Generation Satellites V; (2001).

Invitation to Pay Additional Fees in Application No. PCT/US2021/065849 dated Jul. 28, 2022 (13 pgs).

Schiller et al., "The Specular Array Radiometric Calibration (SPARC) Technique as a Vicarious Methodology for Accurate Intersensor Calibration," Retrieved from the Internet: URL:https://digitalcommons.usu.edu/cgi/viewcontent.cgi?article=1126&context=calcon, 18 pgs. (Aug. 28, 2012).

* cited by examiner

SYSTEMS AND METHODS FOR INTERSENSOR SATELLITE CALIBRATION

TECHNICAL FIELD

The subject disclosure relates to sensor calibration and more particularly to intercalibration of radiometrically consistent satellite constellations.

BACKGROUND

Planetary observation data from constellations of satellites is becoming more and more abundant. In parallel, demand has grown for consistent and reliable planetary observation data sets having interoperability of temporal data collections at multiple resolutions. Producing data sets providing immediate analysis with minimum user interface is difficult to achieve, requiring robust intercalibration between what are, at times, disparate sensor systems. Intercalibration of large amounts of data requires collection and procession with calibration protocols and traceable references that are radiometrically consistent when applied to all members of the constellation.

Instruments are typically intercalibrated when they are viewing the same reference target coincidently from the same view and illumination angles in a posture that is referred to as intersensor calibration. Achieving simultaneity of overlapping imagery, target properties, environmental conditions and target view and illumination geometry among constellation members is generally infrequent or not possible.

SUMMARY OF THE TECHNOLOGY

The application, in various implementations, addresses deficiencies associated with establishing consistent image data derived from multiple satellites within a satellite constellation.

In at least one aspect, this application describes an exemplary use of Specular Array Calibration (SPARC) targets, i.e., reference targets that are radiometrically stable and repeatable through time, provide illumination and view geometry, and are located at various locations on the earth. As a result, simultaneity of observations by different satellite sensors is not required. According to this implementation, observations of SPARC targets that are creating an image of the sun by transferring an unsaturated absolute solar signal to a satellite using, for example, convex mirrors, enable derivation, for each satellite and spectral band, of a reference parameter known as the zero airmass response constant (ZARC). This ZARC parameter provides a stable and repeatable intrinsic inflight digital number proportional to the absolute radiometric gain coefficients each time a SPARC target is imaged.

One or more implementations provide an algorithm that derives a set of transformation functions, based on the ZARC coefficients, equating the absolute spectral gains of all constellation members to the SPARC radiometric scale. This process allows one to achieve radiometric consistency among satellite constellation members and minimizes biases between them. It then becomes possible to transfer absolute gain from a selected reference sensor of a satellite for the constellation to an absolute gain on the same radiometric scale for any other member of the constellation. In addition, when one constellation member measures the digital number response of a target of interest, it allows the analyst to know what the likely digital number response of any other sensor would be in the same spectral band image of that target (i.e., common countdown).

A method for intersensor calibration includes imaging a solar signal using a mirror to create an image reference target. The method includes detecting the image reference target using a first sensor. The method includes generating a zero airmass response constant based on a ground sampling distance of the first sensor and an at-sensor radiance value. The at-sensor radiance value is based on an at-sensor, top-of-atmosphere intensity of the image reference target. The method includes computing a radiometric gain coefficient of the first sensor using the zero airmass response constant. The method includes comparing the radiometric gain coefficient of the first sensor to a radiometric gain coefficient of a second sensor to determine a gain ratio between the first sensor and second sensor.

The method for intersensor calibration may include repeatedly detecting the image reference target using a first sensor, generating a zero airmass response constant based on a ground sampling distance of the first sensor and an at-sensor radiance value, computing a radiometric gain coefficient of the first sensor using the zero airmass response constant, and comparing the radiometric gain coefficient of the first sensor to a radiometric gain coefficient of a second sensor to determine a gain ratio between the first sensor and second sensor for a plurality of sensors. In this regard, the method may include comparing the radiometric gain coefficient of each of the plurality of sensors to the radiometric gain coefficient of the second sensor and determining a gain ratio between each of the plurality of sensors to the second sensor.

The zero airmass response constant may be based on a spectral band of the image reference target. In this regard, the method may include repeatedly generating a zero airmass response constant based on a ground sampling distance of the first sensor and an at-sensor radiance value, the at-sensor radiance value based on an at-sensor, top-of-atmosphere intensity of the image reference target for a plurality of spectral bands. The zero airmass response constant may define an intrinsic response coefficient, or digital number, for each spectral band. The zero airmass response constant may include an image point response function of the mirror.

The mirror may include a convex mirror. The method may include an array of mirrors. The image reference target may include a SPARC target, wherein the SPARC target includes a reflection of a star. The method may include measuring solar irradiance using a radiometer and comparing a resulting solar irradiance measurement to the at-sensor radiance value.

A satellite intersensor calibration system includes a mirror configured to image a solar signal to produce an image reference target. The system includes a first sensor configured to detect the image reference target. The system includes an intersensor calibration processor. The intersensor calibration processor is arranged to generate a zero airmass response constant based on a ground sampling distance of the first sensor, compute a radiometric gain coefficient of the first sensor using the zero airmass response constant, and compare the radiometric gain coefficient of the first sensor to a second sensor.

The system may include a satellite including the intersensor calibration processor. The intersensor calibration processor may be arranged to compare the radiometric gain coefficient of the sensor with the second sensor.

The first or second sensor may be on an airborne vehicle; an unmanned aerial vehicle; a satellite; a drone; a ground based facility; or a ground based platform. The second sensor may be configured to detect the image reference target.

The mirror may include a convex mirror. The mirror may include a plurality of mirrors. The system may include a radiometer to measure a solar irradiance to compare to the at-sensor radiance value.

A satellite imaging system includes a plurality of satellites, each satellite including a sensor configured to detect a reference signal from one or more reference image sources, each sensor outputting an at-sensor radiance value associated with each detected reference signal, each sensor outputting image data associated with a detected image.

The imaging system includes an intersensor calibrator. The intersensor calibrator is arranged to receive the at-sensor radiance value from each of the plurality of satellites. The intersensor calibrator is arranged to generate a zero airmass response constant based on a ground sampling distance of each sensor and the at-sensor radiance value associated with each sensor, the at-sensor radiance value being based on an at-sensor, top-of atmosphere intensity of each of the one or more image reference sources. The intersensor calibrator is arranged to determine a radiometric gain coefficient associated with each sensor of the plurality of satellites using the zero airmass response constant associated with each sensor of the plurality of satellites. The intersensor calibrator is arranged to determine a plurality of gain ratios, each gain ratio being based on a comparison of the radiometric gain coefficient of each sensor of the plurality of satellites with a radiometric gain coefficient of a reference sensor.

The imaging system includes an image tracker. The image tracker is arranged to receive image data from each of the sensors associated with the plurality of satellites. The image tracker is arranged to receive the plurality of gain ratios, wherein each of the plurality of gain ratios corresponds to each of the sensors associated with the plurality of satellites. The image tracker is arranged to generate calibrated image data associated with each sensor based on adjusting the received image data from each of the sensors associated with the plurality of satellites using a gain ratio corresponding to each sensor.

DETAILED DESCRIPTION

Figure 1:
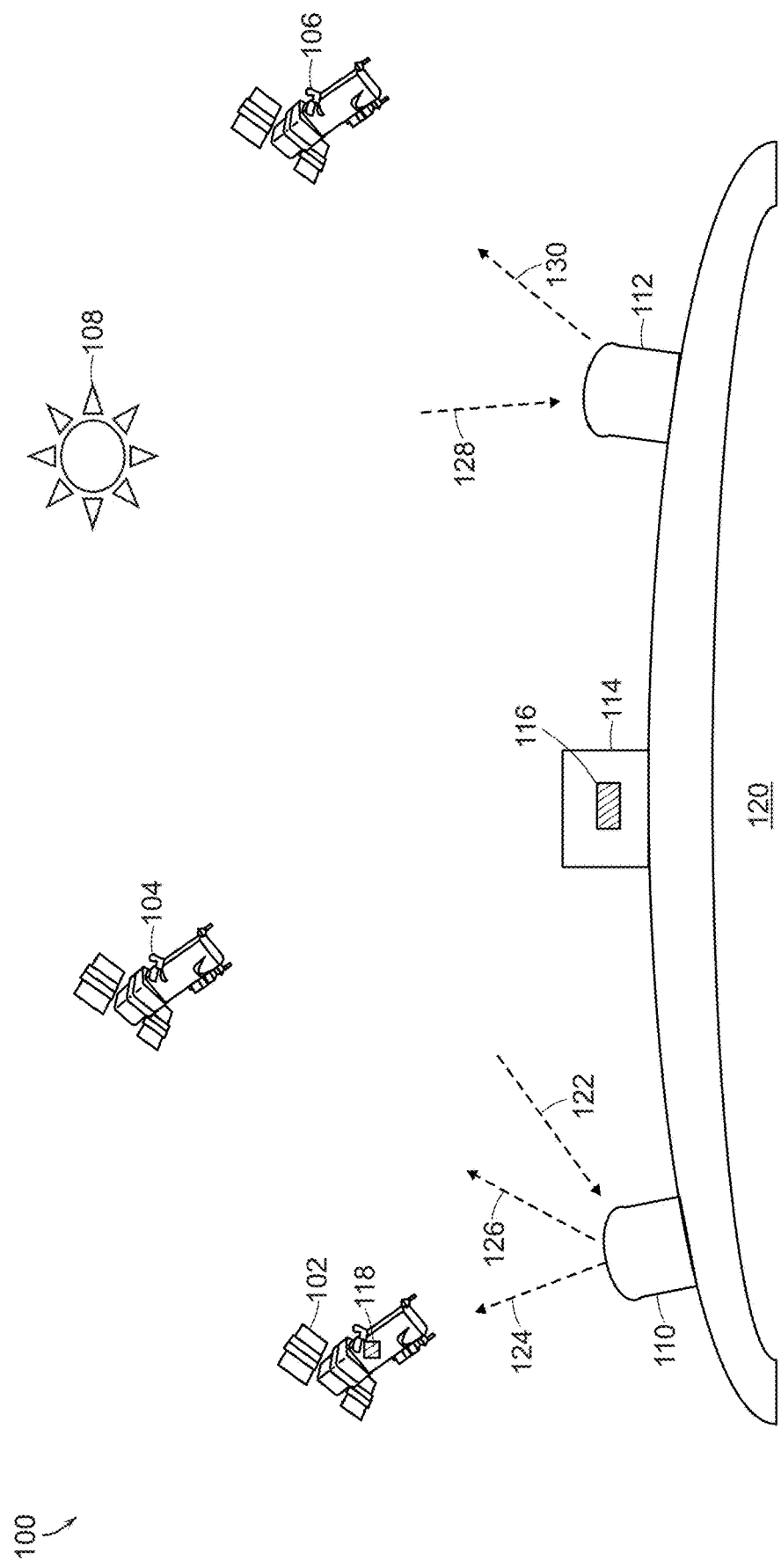
FIG. 1 is a perspective view of an exemplary satellite intersensor calibration system showing a constellation of three satellites and two mirrors, including image reference targets.

The subject technology addresses deficiencies associated with sensor calibration, including producing harmonized data through intercalibration between often disparate sensor systems. The application includes imaging Specular Array Calibration (SPARC) targets as reference targets that are radiometrically stable over the sensor's operational range of illumination and view geometry as well as response dynamic range. Such reference targets make possible intersensor calibration, such as a robust virtual constellation that delivers harmonized data.

Cross-calibration is the process of characterizing and correcting the radiometric bias between sensors, using data obtained by the sensors under calibration, generally in the time scale of near coincident image collects of the reference target(s). Intercalibration of satellite instruments, or intersensor calibration, however extends the calibration methodologies that measure, characterize, and evaluate instrument and system radiometric performance and improve radiometric processing parameters for individual constellation members to the overall long-term reliability of interoperable data sets for the constellation as a whole with the intent of maintaining accurate long term monitoring. Intersensor calibration refers to the complete process of radiometric calibration using a coordinated calibration methodology, trending of sensor gains and biases, correction to a common radiometric scale, and data qualitative assurance and traceability needed for the extraction of physical information.

A temporal series of intersensor calibrations may be used to establish or validated an intersensor calibration system. For example, in some implementations, satellite intersensor calibration systems may create a star-like image of the sun, and transfer the unsaturated absolute solar signal to a plurality of satellites within a steerable narrow field-of-regard the SPARC target directs at a satellite. In such an example, observation of SPARC targets including the solar signal can derive for each satellite and spectral band in the satellite intersensor calibration system a reference parameter known as the ZARC. Over time, ZARC provides a trending intrinsic inflight digital number response proportional to the absolute radiometric gain coefficients measured each time a SPARC target is imaged. The ZARC may be referred to herein as $DN_o(\lambda)$.

This application includes an algorithm that derives a set of transformation functions, based on the ZARC coefficients, equating absolute spectral gains of all constellation members to a radiometric scale defined by SPARC reference targets. This process allows radiometric consistency among constellation members and minimize biases between them. This application further includes transferring an absolute gain from a selected reference sensor for the constellation to an absolute gain on a same radiometric scale for any other member of the constellation. A constellation member may thereafter measure the digital number response of any target of interest in a scene, wherein the digital number response for that target of interest by any other sensor in the constellation may thereafter be computed and transferred to physical units in the same spectral band image of that target for intrinsic analysis.

FIG. 1 is a perspective view of an exemplary satellite intersensor calibration system 100 showing a constellation of three satellites 102, 104, 106 and two reference targets 110, 112, or mirrors such as a SPARC reference targets, reflecting light energy from traceable calibration sources such as celestial objects like the sun, moon or stars, or Earth-based active sources such as blackbody sources, incandescent lamps, LEDs, or laser illumination systems. As shown in FIG. 1, satellite intersensor calibration system 100 includes satellites 102, 104, 106, also referred to herein as sensors, positioned on orbit at a known distance from the reference targets 110, 112 fixed to planetary object 120. In other configurations, reference targets 110, 112 can also be located above the surface on an airborne or independent orbiting platform, or on a platform floating on a water surface. In some implementations, a satellite 102, 104, 106 may include one or more image sensors configured to capture image data within one or more spectral ranges including, without limitation, Ultraviolet (UV), Visible and near-Infrared (VNIR), Short-Wave Infrared (SWIR), and Mid-Wave Infrared (MWIR). Satellites 102, 104, 106 may include any type of electro-optical sensor placed on communications satellites, remote sensing satellites, navigation satellites, geocentric orbit type satellites, polar satellites, military and civilian Earth observation satellites, weather satellites, and the like. Satellites 102, 104, 106 may also include space telescopes, space stations, and other sensing objects intentionally placed into orbit. Satellites 102, 104, 106 may include a low earth orbit or intermediate circular orbit with an altitude ranging from 180 km to 2,000 km, a medium earth orbit with an altitude ranging from 2,000 km to 35,786 km, a geocentric circular orbit with an altitude of 35,786 km, or a high earth orbit with an altitude above 35,786 km. Satellites 102, 104, 106 may include a galactocentric orbit, geocentric orbit, heliocentric orbit, areocentric orbit, or an orbit centered around another planet or celestial object otherwise located in space. In another embodiment, sensors 102, 104, 106 may include airborne, drone, and ground located sensors.

With respect to the orbit of satellites 102, 104, 106, each satellite 102, 104, 106 may include a ground sampling distance (GSD) defined by the sensor's instantaneous field-of-view (IFOV) and sensor to reference target distance for each source image collected, detected, or observed. The shape of the IFOV may be square, rectangular, circular or any arbitrary shape of known solid angle. Nominally, the pixel is square or rectangular such that the GSD is the distance between the consecutive pixel centers measured as a cross-scan or along-scan dimensions projected on the ground for an image. The GSD can represent the size of native pixels (associated with raw unprocessed images) or resample pixels in images. Generally, the larger the GSD, the lower the spatial resolution of the image and the less visible detail. For example, a GSD of 0.05 meters means that one pixel in an image equates linearly to 0.05 meters on the ground. Where source images are planar and two-dimensional, GSD may be observed with respect to an X-axis and Y-axis such that a GSD may be measured in multiple dimensions. For example, an along-scan GSD is the distance between the consecutive pixel centers of two pixels neighboring along an X-axis of the source image measured on the ground, whereas a cross-scan GSD is the distance between the consecutive pixel centers of two pixels neighboring along a Y-axis of the source image measured on the ground.

A sensor 102, 104, 106 may include a reference or native GSD, $GSD_o$. A reference ground sample distance, $GSD_o$, is a value assigned as the GSD producing a sensor digital number response (DN) normalization when imaging the reference target from an agile sensor. An agile sensor is one that can view a reference target over a wide range of sensor to target distances (and thus a range of GSDs) resulting from off-nadir view geometry maneuvers. For each reference target image recorded, the operational DN response is calculated as the total DN integrated over the SPARC target point response function after background subtraction. The response normalization is the application of the inverse square law applied to point source SPARC reference targets. It converts the actual operational DN response at the operational GSD to a normalized response, $DN_o$, that sensor would produce if it imaged the target at the reference GSD, $GSD_o$. For example the $GSD_o$ of a satellite 102, 104, 106 such as the IKONOS Pan spectral band is 0.8 meters. For example the $GSD_o$ of a satellite 102, 104, 106 such as IKONOS MSI spectral bands is 3.2 meters. For multiple image collects over a range of GSDs by a IKONOS like sensor in the constellation, all the operational DN responses to the SPARC point targets would be normalized to the $DN_o$, response at these IKONOS reference GSD values, $GSD_o$.

Satellites 102, 104, 106 may include telemetry subsystems to monitor on-board equipment operations and transmit operational data including data related to the on-board equipment operations to a satellite interface facility 114. In this regard, satellites 102, 104, 106 may include a transponder capable of receiving radio signals, amplifying received radio signals, and sorting input signals and directing output signals through a signal multiplexer to a downlink antenna situated on planet 120. As such, the satellites 102, 104, 106 may receive commands based on the transmission of operational data.

Satellites 102, 104, 106 may include radiation sensors. For example, in some implementations, satellites 102, 104, 106 include electronic devices for measuring the radiant flux of electromagnetic radiation. Electromagnetic radiation may include radiation from reflection, emission, and emission reflection. The electronic devices may include infrared radiation detectors, ultraviolet detectors, or a device similar to or the same as a radiometer. In this regard, satellites 102, 104, 106 may measure at-sensor radiance values, star to ground transmittance values, and ground to sensor transmittance values, wherein each of the transmittance values include a fraction of incident light which is transmitted from the respective locations. Satellites 102, 104, 106 may also include imaging sensors such that satellites 102, 104, 106 include electronic devices that detect the presence of spatially extended objects and their radiometric and photometric colors within a field-of-view and convert this information into a visual image for further exploitation of the physical properties of all objects of interest within the scene.

Satellites 102, 104, 106 may include one or more image sensors configured to capture image data in bands, spectral ranges, or channels, i.e., different satellite sensors configured to measure the intensity, irradiance or radiance of a plurality of wavelengths of light. The plurality of wavelengths may include multispectral, hyperspectral or ultraspectral resolution. As such, satellites 102, 104, 106 may measure a relative spectral response. Bands may include coastal aerosol, blue, green, red, near infrared, short-wave infrared 1, short-wave infrared 2, panchromatic, cirrus, thermal infrared 1, thermal infrared 2, and the like. Each band may represent a range of wavelengths. For example, a coastal aerosol band may represent a wavelength range of 0.43-0.45 micrometers. Other ranges of bands may include 0.45-0.51 micrometers, 0.52-0.60 micrometers, 0.52-0.90 micrometers, 0.53-0.59 micrometers, 0.50-0.68 micrometers, 0.63-0.69 micrometers, 0.64-0.67 micrometers, 0.77-0.90 micrometers, 0.85-0.88 micrometers, 1.36-1.38 micrometers, 1.55-1.75 micrometers, 1.57-1.65 micrometers, 2.09-2.35 micrometers, 2.11-2.29 micrometers, 10.40-12.50 micrometers, 10.60-11.19 micrometers, 11.50-12.51 micrometers, and the like. In some implementations, bands may include a range of wavelengths ranging from $1\times10^{-14}$ meters to $1\times10^4$ meters and the like. Bands may include a range of wavelengths including gamma rays, x-rays, ultraviolet rays, visible light, infrared rays, radar waves, microwaves, television waves, and radio waves.

Sensors onboard satellites 102, 104, 106 may include a gain with respect to an observed wavelength of light, represented herein as $g(\lambda)$. The gain may be defined as the sensor's DN response at a specified wavelength per at-sensor unit intensity (W/sr/nm), irradiance (W/m²/nm) or radiance (W/m²/sr/nm). Wavelength dependent gain between two sensor systems, such as between two satellites of 102, 104, and 106, can be used to obtain estimates of optical power excursions that occur in optical circuit switching. Any one of satellites 102, 104, or 106 may be referred to herein as a reference satellite to better establish metrological traceability, such that the gain of all satellites in a satellite intersensor calibration system 100 may be compared to the reference satellite.

Satellite intersensor calibration system 100 may include an intersensor calibration processor 116, 118. In some implementations, intersensor calibration processor 118 may be configured to compute a zero airmass response constant (ZARC) for each sensor in a constellation, and further compute a radiometric gain coefficient between one or more sensors in the intersensor calibration system 100 constellation, explained in more detail below. Intersensor calibration processor 116, analyzing individual calibration events, may be situated at a land-based satellite interface facility 114 (i.e. ground station) or upon a satellite 118. Over time, the results from each intersensor calibration may be further processed by data providers, users and analysts to administer a full intersensor calibration, as defined supra, for the constellation under calibration.

Satellite intersensor calibration system 100 may include a star 108, such as the Sun, as a solar reference, providing an internationally agreed upon radiometric traceable source. The star 108 may emit direct solar irradiance 122, 128, toward a SPARC reference targets 110, 112 that uses specular mirrors to create a point source or an extended array of point sources as a secondary standard reference 110, 112 resulting in a metrologically reproducible traceability path between the sensor and the Sun. Solar irradiance may be measured in space as a function of a distance from the star 108, a solar cycle, and cross-cycle changes. Solar irradiance 122, 128 may be measured at the planet 120 surface after atmospheric absorption and scattering, depending on a tilt of the measuring surface, the height of the star 108 above the horizon of planet 120, and atmosphere conditions of planet 120. A sensor independent top-of-atmosphere intensity may be computed based on the solar irradiance 122, 128 directed towards the sensors 102, 106 by the SPARC reference targets 110, 112.

The SPARC reference targets 110, 112 may image the solar disk 108 as an absolute reference, such that the SPARC reference targets 110, 112 create an image, or virtual image, of the star 308 that serves as an image reference target. Any scene captured by the on-board sensors, which includes a SPARC target, may be calibrated individually using the SPARC method. Applying the system and method presented in this application allows the SPARC calibrated sensors to be intercalibrated to the same radiometric scale making possible the measurement of absolute biases between sensors and trending of gain response to maintain knowledge of the absolute performance of the constellation members relative to a constellation reference sensor.

Satellites 102, 104, 106 may detect the image reference target via specular reflectance from the SPARC reference target 110, 112 when the solar image is visible within the SPARC reference target 110, 112 field-of-view aperture stop defined by a mirror diameter of the target 110, 112. Based on the mirror specular reflectance, a Sun to ground transmittance value, a ground to sensor transmittance value, a top-of-atmosphere (TOA) solar spectral irradiance constant, an along-scan and cross-scan ground sampling distance, and a mirror radius of curvature, an at-sensor radiance can be computed, explained in further detail below, wherein calibration between satellites 102, 104, 106 may thereafter be computed based on at-sensor radiance values at each.

Figure 2:
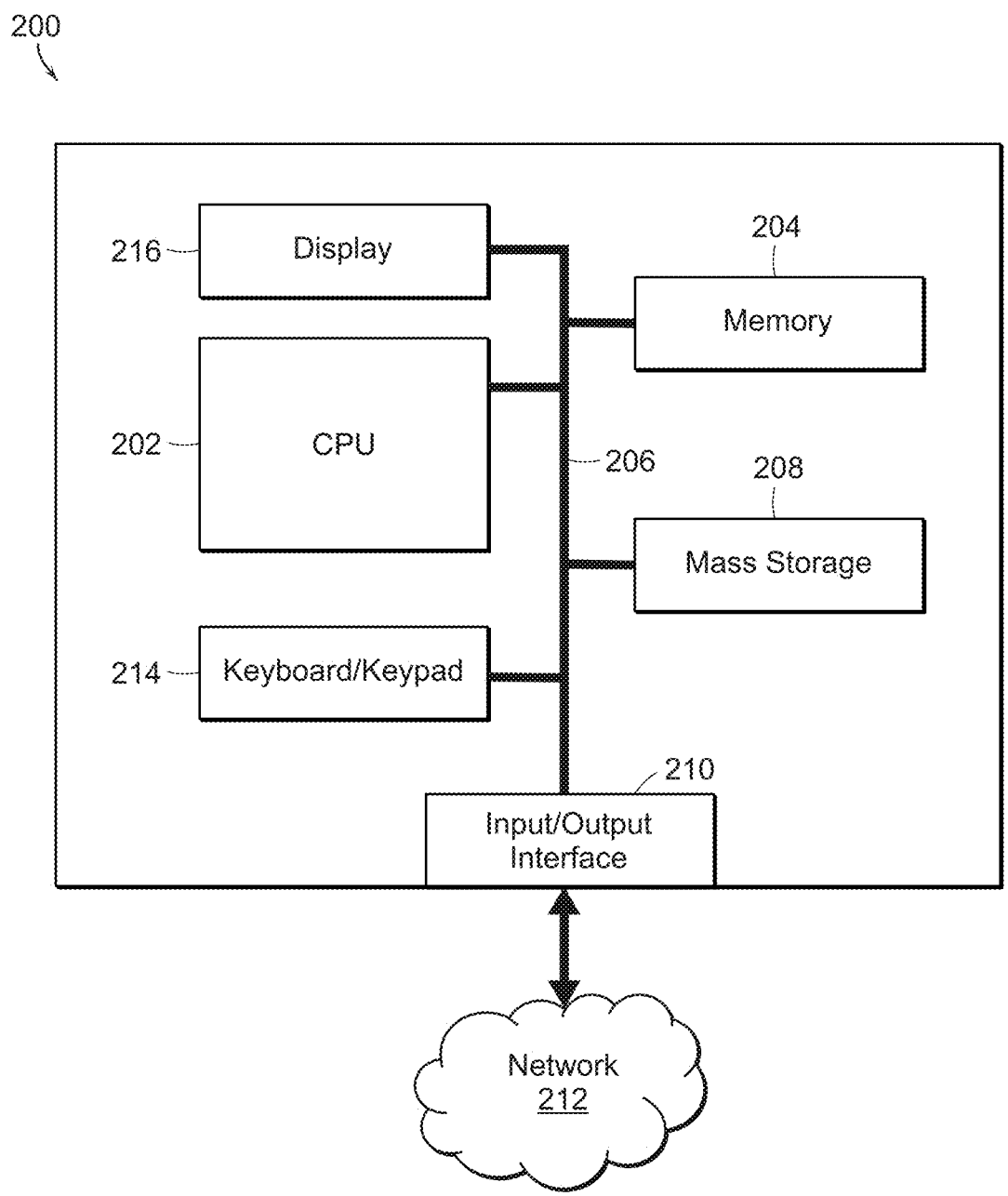
FIG. 2 is a block diagram of a computer system arranged to perform processing associated with a satellite intersensor calibration system.

FIG. 2 is a block diagram of a computer system arranged to perform processing associated with a constellation intersensor calibration system 100, 300, 400. FIG. 2 is block diagram of a computer system 200 arranged to perform processing associated with a intersensor calibration system such as, for example, system 100, 300, 400. FIG. 2 may resemble a computer system used as an intersensor calibrator 420 or image tracker 428. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid state memories, for storing data and instructions for use by the CPU 202. At least one component of the mass storage system 208, preferably in the form of a non-volatile disk drive, solid state, or tape drive, stores the database used for processing data and controlling functions of a intercalibration system 100, 300, 400. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PCMCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a processor according to FIG. 1, the data interface 210 may provide a relatively high-speed link to a network 212, such as an intranet, internet, Aegis network, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed multi-sensor processing related to, for example, a common operational picture (COP). Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212. This may include, remote, automated, and robotic tasking of the SPARC reference targets 110,112 to illuminate constellation satellites 102, 104, 106 during their individual reference target overpass.

The computer system 200 may run a variety of application programs and store associated data in a database of mass storage system 208. One or more such applications may include an image tracker or intersensor calibrator as described with respect to FIG. 4.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as waveform control, streaming cross-correlations, artifact corrections, target acquisitions, and the tracking and discrimination of targets. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with systems 100, 300, 400, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the systems 100, 300, 400 include a networked-based, e.g., Internet-based, application that may be configured and run on the system 200 and/or any combination of the other components of the systems 100, 300, 400. The computer system 200 may include a web server running a Web 2.0 application or the like. Web applications running on systems 100, 300, 400 may use server-side dynamic content generation mechanisms such, without limitation, Java servlets, CGI, PHP, or ASP. In certain implementations, mashed content may be generated by a web browser running, for example, client-side scripting including, without limitation, JavaScript and/or applets on a wireless device.

In certain implementations, system 100, 200, 300, and/or 400 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 100, 300, 400, computer system 200, or another component of system 100, 300, 400 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

It will be apparent to those of ordinary skill in the art that certain aspects involved in the operation of the system 100, 300, 400, or other devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Figure 3:
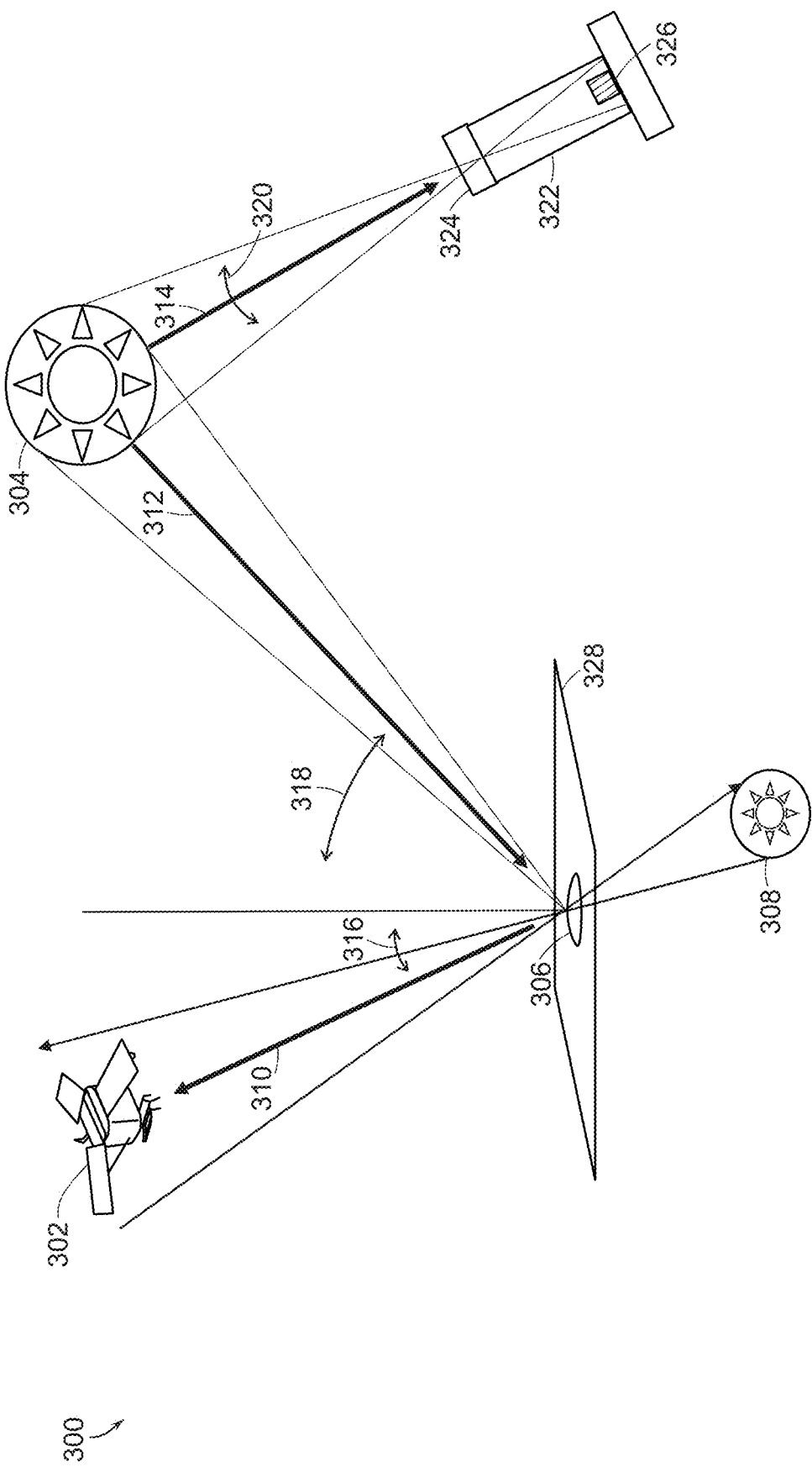
FIG. 3 is another perspective view of an exemplary satellite intersensor calibration system.

FIG. 3 is another perspective view of an exemplary satellite intersensor calibration system 300. As shown in FIG. 3, satellite intersensor calibration system 300 includes a SPARC reference target 306, referred to herein as SPARC target mirror or mirror, examples of which are described herein with reference to FIG. 5. In this example, mirror 306 is a convex mirror placed on a uniform background 328. The electromagnetic energy reflected by the convex mirror 306 will produce a profile of the sensor system point response function (PRS) in a sensor image elevated in DN space, explained in further detail below, above and separable from a low spatial frequency DN distribution of the background 328 that includes scattered light from the intervening atmosphere (i.e., path radiance). Satellite intersensor calibration system 300 also includes a star 304. The example SPARC reference target 306 is configured to create an image or virtual image 308 of the star 304 visible to the sensor 302 when the line of sight from the sensor 302 to the image 308 passes through a field-of-view aperture stop defined by the edge of the mirror 306. In this configuration, the mirror 306 relays an image 308, or virtual image, of the star 304 that appears as a point source PRF superimposed on an extended uniform background 328. In this regard, a SPARC target 306, reflecting electromagnetic energy of a star 304, is imaged or otherwise reflected in proximity to a planetary surface, such as the surface of a planet 120, such that an image 308 of the star 304 can be seen while viewing, scanning, or targeting the planet 120 from orbit rather than shifting to view, scan, or target the star 304 itself. In this example, star 304 is the Sun, wherein the Sun may emit direct solar irradiance 312, the direct solar irradiance including light, through the field-of-view aperture stop defined by the rim of the mirror 306 as mentioned prior. In this regard, the SPARC target mirror 306 may reflect the light 312 to create the image 308 of the star 304.

The direct solar irradiance 312 may be received by the SPARC target mirror 306 at an angle 318, referred to herein as $\theta_{Sun}$, relative to a zenith point 330 where the zenith point includes an imaginary axis directly above a particular location, in this case SPARC target mirror 306, on a celestial sphere, such as planet 120. Above refers to a vertical direction in opposition to a gravity direction at or near a center of the SPARC target mirror 306. In some implementations, the direct solar irradiance may be received at an angle 318 including 0°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180°, or an angle between 0° and 180°. In some implementations, the direct solar irradiance may be received at a complimentary, supplementary, or conjugate angle, or an angle beyond 180°, such as 270°, 360°, or an angle between 180° and 360°.

The direct solar irradiance 312 may be hindered by atmospheric absorption, scattering, conditions and the like, and as such, the throughput of the solar irradiance 312 can be represented by a Sun to target transmittance, referred to herein as $\tau_\downarrow$. For spectral bands in which the extinction law applies, $\tau_\downarrow = e^{-\delta sec\theta_{Sun}}$, where $\delta$ represents a vertical optical depth in a uniform plane parallel the atmosphere of planet 120. Extinction is the absorption and scattering of electromagnetic radiation, such as that of solar irradiance 312, by dust and gas between the emitting star 304 and the observer, in this case the SPARC target mirror 306. The transmittance of the direct solar irradiance from star 304 to SPARC target mirror 306, $\tau_\downarrow$, may be dependent on a wavelength or frequency of light included in the direct solar irradiance 312.

As mentioned prior, the direct solar irradiance 312 may reflect from the SPARC target mirror 306, the reflection including the image 308 of the star 304. The direct solar irradiance 312 may reflect from the SPARC target mirror 306 via specular reflectance based on the material of the SPARC target mirror 306. In this regard, a mirror-like reflection of waves, such as direct solar irradiance 312, reflects from the surface of the spherical mirror 306 a SPARC target image or virtual image 308. The degree of participation of reflection, refraction, reflectance and absorption from SPARC target mirror 306 may be represented as a function of the frequency, or wavelength, of the light included with the direct solar irradiance 312 and an angle of incidence, referred to prior as angle 318 and $\theta_{Sun}$. This specular reflection function may be represented herein as $\rho(\lambda, \theta_{Sun})$ or the SPARC target mirror 306 reflectance of a wavelength of direct solar irradiance 312 at the direct solar irradiance angle of incidence 318.

Light 310 including the image 308, formed from the direct solar irradiance 312 reflecting from the SPARC target mirror 306, may thereafter be received or detected by a sensor or satellite 302, sensor and satellite used interchangeably herein. Light 310 including the image 308 may be received or detected by sensor 302 at an angle 316, referred to herein as $\theta_{sen}$, relative to a zenith point 330 where the zenith point includes an imaginary axis directly above a particular location, in this case SPARC target mirror 306, on a celestial sphere, such as planet 120. Above refers to a vertical direction in opposition to a gravity direction at or near a center of the SPARC target mirror 306. In some implementations, light 310 including the image 308 may be received or detected by sensor 302 at an angle 316 including 0°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180°, or an angle between 0° and 180°. In some implementations light 310 including the image 308 may be received or detected at a complimentary, supplementary, or conjugate angle, or an angle beyond 180°, such as 270°, 360°, or an angle between 180° and 360°.

The light 310 including the image 308 may be hindered by atmospheric absorption, scattering, conditions and the like, and as such, the throughput of the light 310 from the SPARC target mirror 306 to the sensor 302 can be represented by a target to sensor transmittance, referred to herein as $\tau_\uparrow$. For spectral bands in which the extinction law applies, $\tau_\uparrow = e^{-\delta sec\theta_{sen}}$, where $\delta$ represents a vertical optical depth in a uniform plane parallel the atmosphere of planet 120. Extinction is the absorption and scattering of electromagnetic radiation, such as light 310 including the image 308, by dust and gas between the SPARC target mirror 306 and the observer, in this case sensor 302. The transmittance from the target mirror 306 to sensor 302, $\tau_\uparrow$, may be dependent on a wavelength or frequency of light reflecting from the SPARC target mirror 306.

The sensor 302 may be a first sensor 302 with respect to a plurality of sensors. The sensor 302 may be a second sensor 302 with respect to a plurality of sensors. The sensor 302 may be a reference sensor 302 with respect to a plurality of sensors. The sensor 302 may be among a plurality of sensors, each of the sensors 302 included within the plurality of sensors capable of detecting the image 308. In this regard, any satellite 302 within a satellite intersensor calibration system 300 or satellite imaging system, may be capable and configured respectively to detect the image 308 through use of radiation sensors, imaging sensors, and other like sensors mentioned prior.

In some implementations, satellite intersensor calibration system 300 may also include solar radiometer 322. Solar radiometer may detect or image direct solar irradiance 320 of a rising or setting Sun 304, with reference to a Langley plot used to derive atmospheric transmittance and vertical optical depth. In this regard, solar radiometer may include an aperture stop 324 and detector 326. Measurements produced by solar radiometer 322 may be used to derive $\tau_\downarrow$ and $\tau_\uparrow$ and calculate an at-sensor 302 radiance value.

Figure 4:
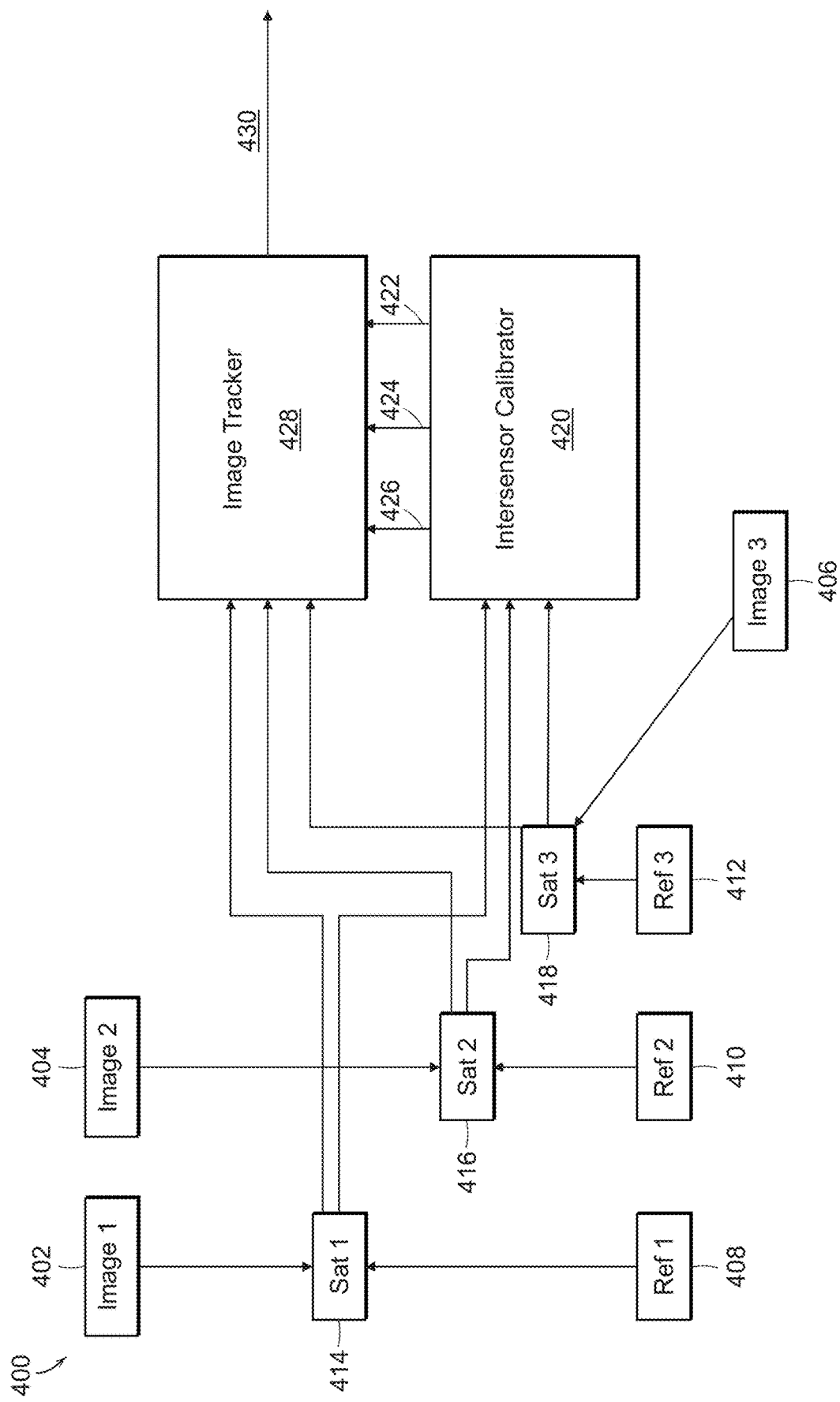
FIG. 4 is a block diagram an exemplary process for satellite intersensor calibration.

FIG. 4 is a block diagram of an exemplary process for satellite intersensor calibration 400. As shown in FIG. 4, the process 400 includes a plurality of satellites 414, 416, 418, examples of which are described herein. In other implementations, an exemplary process for satellite intersensor calibration 400 may include several more satellites, or several less satellites, such as more or less than three satellites. Satellites 414, 416, 418 may collect observation data 402, 404, 406 including communications data, remote sensing data, navigation data, orbit type data, military and civilian data, weather data, imaging data and supporting metadata, other planetary observation data, space observation data, and the like. Here, the example satellites 414, 416, 418 collect image data 402, 404, 406 related to Earth observation. However, example satellites 414, 416, 418 may collect image data 402, 404, 406 or other observation data, as mentioned prior, related to another celestial object such as Mars.

The exemplary process for satellite intersensor calibration 400 includes three reference image targets 408, 410, 412 imaged by SPARC target mirrors for satellites 414, 416, 418 as described above. In some implementations, satellites 414, 416, 418 may refer to reference image target 408, 410, or 412 for calibration. For example, satellite 414 may refer to reference image target 408, satellite 416 may refer to reference image target 410, and satellite 418 may refer to reference image target 412. For example, satellite 414 may refer to reference image target 408, satellite 416 may refer to reference image target 408, and satellite 418 may refer to reference image target 408. For example, satellite 414 may refer to reference image target 410, satellite 416 may refer to reference image target 410, and satellite 418 may refer to reference image target 410. For example, satellite 414 may refer to reference image target 412, satellite 416 may refer to reference image target 412, and satellite 418 may refer to reference image target 412. For example, satellite 414 may refer to reference image target 412, satellite 416 may refer to reference image target 410, and satellite 412 may refer to reference image target 408. For example, satellite 414 may refer to reference image target 410, satellite 416 may refer to reference image target 410, and satellite 412 may refer to reference image target 408, and so on. As such, satellite 414, 416, 418 may refer to any reference image target 408, 410, 412 for calibration.

The reference image targets 408, 410, 412 allow for the satellites 414, 416, 418 to record the direct solar irradiance 312 as an absolute intensity or radiance reference imbedded within the satellite 414, 416, 418 observation data. For example, a sensor aboard satellite 414, 416 or 418 responds to a reference image target 408, 410, 412 in a similar manner as a solar radiometer 322 responds to direct solar irradiance 320 of a rising or setting Sun, with reference to a Langley plot. Satellites 414, 416, 418 may record the direct solar irradiance 312 as a radiance reference. The transmittance along the star 304 to SPARC target mirror 306 to sensor 302 optical path is used to derive the sensor 414, 416, 418 response as if there was no atmosphere on planet 120.

In this regard, satellite 414, 416, 418 can be calibrated to determine a spectral zero airmass response constant (ZARC) that can be used to track the radiometric stability of and between sensors 414, 416, 418 via intersensor calibrator 420, based on the temporal trending of results from the intersensor calibration processor 420. The ZARC is a satellite or sensor digital number (DN) response to a solar illuminated SPARC target mirror 306 when the atmospheric transmittance, $\tau_\downarrow$ and $\tau_\uparrow$, is nominal, or 1. The ZARC may be represented as an integrated sum of digital number responses over an image pulse or PRF repetition frequency of a SPARC target mirror 306 image profile containing N identical mirrors. Tracking the ratio of ZARC values for similar bands between two sensors provides a parameter on a common radiometric scale for evaluating interoperability performance.

As such, satellites 414, 416, 418 transmit observation data 402, 404, 406 to intersensor calibrator 420. Intersensor calibrator 420 may receive or detect observation data 402, 404, 406 and data associated with reference image targets 408, 410, 412 from satellites 414, 416, 418. Intersensor calibrator 420 may also receive or detect a sensor independent top-of-atmosphere solar spectral irradiance $E_o$. Top-of-atmosphere solar spectral irradiance is the wavelength-dependent energy input to the top of the planet's 120 atmosphere at a standard distance, such as one astronomical unit from a star, where the star 304 is the Sun. $E_o$ may also be represented as the spectral band response function of a particular spectral band energy to the top of the planet's 120 atmosphere at a standard distance. The intersensor calibrator 420 may be configured to calculate a top-of-atmosphere intensity with a series of parameters, received or detected from satellites 414, 416, 418. The parameters include the SPARC target mirror reflectance, the Sun to SPARC target mirror transmittance, the SPARC target mirror to sensor transmittance, the top-of-atmosphere solar spectral irradiance, and a SPARC target mirror radius, described in further detail herein. The intersensor calibrator 420 may process these parameters through the following equation:

$$I(\lambda, \theta_{Sun}) = \rho(\lambda, \theta_{sun})\tau_\downarrow(\lambda)\tau_\uparrow(\lambda)E_o(\lambda)R^2 \qquad (1)$$

where $I(\lambda, \theta_{Sun})$ is the top-of-atmosphere intensity at the reflectance angle $\theta_{Sun}$ with respect to the spectral wavelength; $\rho(\lambda, \theta_{Sun})$ is the SPARC target mirror reflectance at the reflectance angle $\theta_{Sun}$ with respect to the spectral wavelength; $\tau_\downarrow(\lambda)$ is the Sun to SPARC target mirror transmittance with respect to the spectral wavelength; $\tau_\uparrow(\lambda)$ is the SPARC target mirror to sensor transmittance with respect to the spectral wavelength; $E_o(\lambda)$ is the top-of-atmosphere solar spectral irradiance with respect to the spectral wavelength, or spectral band response function of a particular spectral band; and R is SPARC target mirror radius of curvature (meters).

The intersensor calibrator 420 may thereafter process an at-sensor radiance per mirror N included in the SPARC target mirror 306 through the following equation:

$$L_{at-sensor}(\lambda, \theta_{Sun}) = \rho(\lambda, \theta_{Sun})\tau_\downarrow(\lambda)\tau_\uparrow(\lambda)E_o \frac{R^2}{4GSD(x)GSD(y)} \qquad (2)$$

where $L_{at-sensor}(\lambda, \theta_{Sun})$ is the at-sensor radiance per mirror N included in the SPARC target mirror with respect to the spectral wavelength and the reflectance angle $\theta_{Sun}$; $\rho(\lambda, \theta_{Sun})$ is the SPARC target mirror reflectance with respect to the spectral wavelength and the reflectance angle $\theta_{Sun}$; $\tau_\downarrow(\lambda)$ is the Sun to SPARC target mirror transmittance with respect to the spectral wavelength; $\tau_\uparrow(\lambda)$ is the SPARC target mirror to sensor transmittance with respect to the spectral wavelength; $E_o(\lambda)$ is the top-of-atmosphere solar spectral irradiance with respect to the spectral wavelength, or spectral band response function of a particular spectral band; R is SPARC target mirror radius of curvature (meters); GSD(x) is the along-scan GSD (meters); and GSD(y) is the cross-scan GSD (meters).

Assuming a linear, bias subtracted response for sensor 414, 416, 418, then:

$$DN_o(\lambda) = g(\lambda) L_{at-sensor}(\lambda, \theta_{Sun}) \quad (3)$$

where $DN_o(\lambda)$ is a wavelength dependent sensor or satellite digital response to a solar illuminated SPARC target mirror when the atmosphere transmittance, $\tau_\downarrow(\lambda)$ and $\tau_\uparrow(\lambda)$, is 1; $g(\lambda)$ is the wavelength dependent radiometric gain of the sensor; and $L_{at-sensor}(\lambda, \theta_{Sun})$ is the at-sensor radiance per mirror N included in the SPARC target mirror with respect to the spectral wavelength and the reflectance angle $\theta_{Sun}$.

As such, assuming the pixels of image data are square, combining equations 2 and 3, the intersensor calibrator may process a wavelength dependent sensor or satellite digital response to a solar illuminated SPARC target mirror when the atmosphere transmittance is nominal through the following equation:

$$DN_o(\lambda) = g(\lambda)\rho(\lambda)E_o(\lambda)\left(\frac{R}{2GSD_o}\right)^2 \quad (4)$$

or $$DN_o(\lambda)GSD_o = g(\lambda)\rho(\lambda)E_o(\lambda)\left(\frac{R}{2}\right)^2 \quad (5)$$

where $DN_o(\lambda)$ is a wavelength dependent sensor or satellite digital response to a solar illuminated SPARC target mirror when the atmosphere transmittance, $\tau_\downarrow(\lambda)$ and $\tau_\uparrow(\lambda)$, is 1, referred to herein as sensor ZARC; $GSD_o$ is the sensor reference ground sampling distance; $g(\lambda)$ is the wavelength dependent radiometric gain of the sensor; $\rho(\lambda)$ is the SPARC target mirror reflectance with respect to the spectral wavelength, where the change in reflectance angle is negligible for angles 316 and 318 on a specular surface of high reflectance; $E_o(\lambda)$ is the top-of-atmosphere solar spectral irradiance with respect to the spectral wavelength, or spectral band response function of a particular spectral band; and R is SPARC target mirror radius of curvature (meters).

In any atmosphere of planet 120, when imaging a SPARC target mirror 306, the digital number per mirror derived from the PRF image of the SPARC target mirror 306 may be represented by:

$$DN(\lambda) = g(\lambda)L_{at-sensor}(\lambda) = \tau_\downarrow(\lambda)\tau_\uparrow(\lambda)g(\lambda)\rho(\lambda)E_o(\lambda)\left(\frac{R}{2}\right)^2\left(\frac{1}{GSD^2}\right) \quad (6)$$

where $DN(\lambda)$ is the digital number per mirror response or sensor integrated response; $g(\lambda)$ is the wavelength dependent radiometric gain of the sensor, where the change in reflectance angle is negligible for angles 316 and 318 on a specular surface of high reflectance; and $L_{at-sensor}(\lambda)$ is the at-sensor radiance per mirror N included in the SPARC target mirror with respect to the spectral wavelength; $\tau_\downarrow(\lambda)$ is the Sun to SPARC target mirror transmittance with respect to the spectral wavelength; $\tau_\uparrow(\lambda)$ is the SPARC target mirror to sensor transmittance with respect to the spectral wavelength; $g(\lambda)$ is the wavelength dependent radiometric gain of the sensor; $\rho(\lambda)$ is the SPARC target mirror reflectance with respect to the spectral wavelength; $E_o(\lambda)$ is the top-of-atmosphere solar spectral irradiance with respect to the spectral wavelength, or spectral band response function of a particular spectral band; R SPARC target mirror radius of curvature (meters); and GSD is the operational ground sampling distance of the sensor.

Substituting equation 5 into equation 6 produces a function, which may be used by intersensor calibrator 420, transforming the sensor integrated response, $DN(\lambda)$, for a particular scene containing an image reference target 408, 410, 412, recorded at the sensor 414, 416, 418 native GSD of observational data 402, 404, or 406 and the total atmospheric transmittance measured at the SPARC target mirror 306, $\tau_\downarrow(\lambda)\tau_\uparrow(\lambda)$ the sensor 414, 416, 418 ZARC, $DN_o(\lambda)$, at a sensor 414, 416, 418 native GSD, $GSD_o$:

$$DN_o(\lambda) = \frac{GSD^2 DN(\lambda)}{GSD_o^2 \tau_\downarrow(\lambda)\tau_\uparrow(\lambda)} \quad (7)$$

$DN_o(\lambda)$ is the intrinsic response of the sensor 414, 416, 418 with respect to the spectral band of the SPARC target 408, 410, 412. The $DN_o(\lambda)$ response may be measured over time or in intervals and compared to determine stability. $DN_o(\lambda)$ is referred to herein as the SPARC target based ZARC coefficient. $DN_o(\lambda)$ may be determined for each sensor 414, 416, 418 in a satellite cross calibration system 100, or satellite intersensor calibration system 300 or process 400.

In this regard, the absolute gain coefficient $g(\lambda)$ between two sensors, such as a reference sensor and a second sensor among sensors 414, 416, and 418, for a same or similar band $\lambda$, may be compared through processing of the intersensor calibrator 420. For example, in examining a blue band A between two sensors, the absolute gain $g(\lambda)$ of a second sensor can be transformed to the absolute gain $g(\lambda)$ of a first sensor on a radiometric scale based on a ratio between the intrinsic responses between the sensors $DN_o(\lambda)$. For example, based on equation 4:

$$DN_{o,sensor1}(\lambda) = g_{sensor1}(\lambda)\rho(\lambda)E_{o,sensor1}(\lambda)\left(\frac{R}{2GSD_{o,sensor1}}\right)^2 \quad (8)$$

and $$DN_{o,sensor2}(\lambda) = g_{sensor2}(\lambda)\rho(\lambda)E_{o,sensor2}(\lambda)\left(\frac{R}{2GSD_{o,sensor2}}\right)^2 \quad (9)$$

Assuming each SPARC target 408, 410, 412 has the same number of identical mirrors (within manufacturing uncertainties of reflectance and radius of curvature), the absolute gain of sensor 1 can be computed by intersensor calibrator 420 using the following equation:

$$g_{sensor1}(\lambda) = g_{sensor2}(\lambda)\left[\frac{DN_{o,sensor1}(\lambda)}{DN_{o,sensor2}(\lambda)}\right]\left[\frac{E_{o,sensor2}(\lambda)}{E_{o,sensor1}(\lambda)}\right]\left[\frac{GSD_{o,sensor1}}{GSD_{o,sensor2}}\right]^2 \quad (10)$$

Equation 10 holds true even though a Relative Spectral Response (RSR), or quantum efficiency of sensors 414, 416, 418 at a specific wavelength over the range of a spectral band, in this case similar blue bands, applied to the solar spectrum are not identical. The ratio $$\left[\frac{E_{o,sensor2}(\lambda)}{E_{o,sensor1}(\lambda)}\right]$$

based on integrating the sensor 1 and sensor 2 band RSRs to the solar spectrum separately provides a band correction factor If sensor 2 is a selected reference sensor as the basis for a satellite intercalibration system or constellation, such as a metrology satellite (TRUTHS or CLARREO), having all the members image a target in the SPARC based network to derive the ZARC Ratio, that is $$\left[\frac{DN_{o,sensor1}(\lambda)}{DN_{o,sensor2}(\lambda)}\right],$$

unbiased gain coefficients for all are determined on the SPARC radiometric scale optimizing data interoperability.

As a result, any overpass by a satellite sensor 414, 416, 418 provides an opportunity to measure the ZARC ($DN_o$) for any sensor 414, 416, 418 in the sensor solar reflective spectral bands. ZARC, as a measure of sensor response, can be tracked by intersensor calibrator 420 to monitor sensor radiometric stability. Tracking the ratio of ZARC values for similar bands between two sensors 414, 416, 418 provides a parameter on a common radiometric scale for evaluating interoperability performance. Intercalibration of the ZARC sensor band response between satellites 414, 416, 418 does not require simultaneity of collects when imaging one of more image reference targets 408, 410, 412, or a SPARC target based network to evaluate relative stability and interoperability.

The response or bias of any of the satellites 414, 416, 418 can be characterized based on equation 10 such that the absolute gain, or at-sensor radiance per mirror associated with a SPARC target mirror 306, between two satellites can be compared, and a gain ratio between the sensors computed. In this regard, intersensor calibrator 420 can provide data 424 based on the intercalibration of two sensors to an image tracker 428, where the image tracker 428 also receives collected data 402, 404, 406 from the two satellites. In this regard, image tracker 428 may receive a plurality of gain ratios. Each of the plurality of gain ratios corresponds to each of the sensors associated with the plurality of satellites 414, 416, 418.

Image tracker 428 may thereafter alter data 402, 404, 406 based on the data 424 received from intersensor calibrator 420 regarded the response or bias of the two satellites. The process performs radiometric assessment and evaluation operations and updates each satellite calibration parameter files containing the gain and bias coefficients maintaining optimal interoperability of the constellation image data. For example, through computation of intersensor calibrator 420 of equation 10 for all sensors in a constellation, differences between sensors can be compensated for such that each of the sensors may be placed on the same radiometric scale, and image data 402, 404, 406 collected by each of the sensors can be compensated based on sensor differences along the radiometric scale by image tracker 428. For example, image tracker may generate calibrated image data associated with each sensor 414, 416, 418 based on adjusting the received image data from each of the sensors 414, 416, 418 associated with the plurality of satellites using a gain ratio corresponding to each sensor 414, 416, 418. In another implementation, intersensor calibrator 420 may send gain data 422, 424, and 426, or a portion therefore, to one or more of sensors 414, 416, and 418 to enable the one or more of the sensors to adjust the gain of their image data before transmitting image data 402, 404, 406 to image tracker 428. Hence, image tracker 428 receives calibrated image data 402, 404, and 406 from each sensor 414, 416, 418, eliminating a need to adjust the received image data 402, 404, and 406 at the image tracker 428 or at another image processing system that may receive the calibrated image data 402, 404, and 406. In some implementations, intersensor calibrator 420 or a portion thereof may be located at one or more of sensors 414, 416, and 418.

Figure 5A:
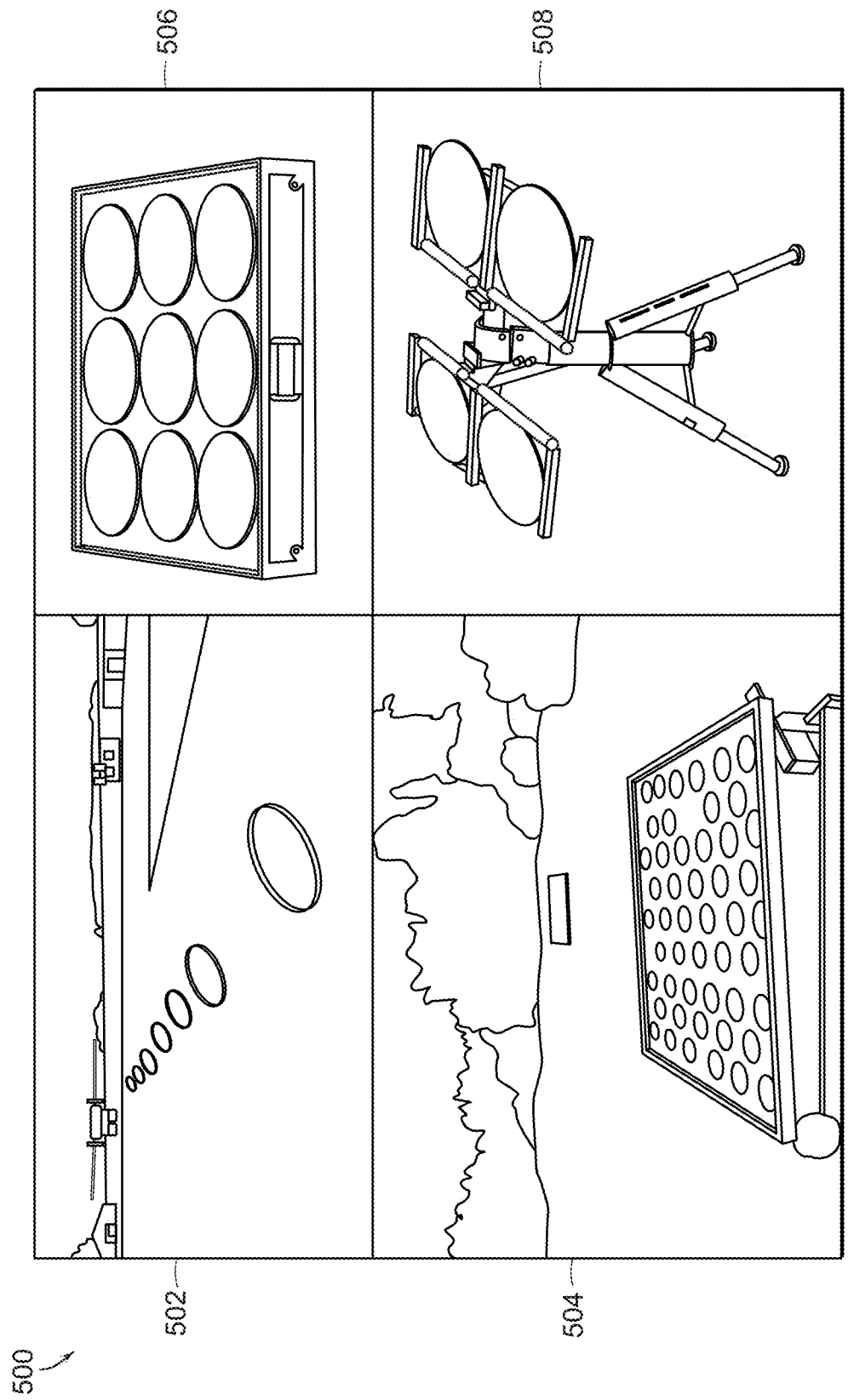
FIG. 5*a* is a perspective view of exemplary implementations of mirrors.

FIG. 5a is a perspective view of exemplary implementations of SPARC mirrors. In some implementations, a SPARC mirror may include a mirror, or more than one mirror aligned. For example, the mirrors may be aligned in a relatively straight line 502 configuration. For example, the mirrors may be suspended from the ground and aligned on a stand 508. For example, the mirrors may be aligned and housed within a shaped structure, such as a box shaped structure 506, plate shaped structure 504, circular shaped structure, polygonal shaped structure and other like shaped structures. In this regard, a plurality of mirrors are available in an array. The array may consist of closely spaced panels of mirrors unresolved by the sensor (subpixel) or spatially separated so that structures are spatially resolved in an image as structures extended over multiple pixels or as separate reference sources, 510.

Exemplary implementations of SPARC mirrors may include curved mirrors. For example, a SPARC mirrors may include convex mirrors having a geometric center, or vertex. The curved mirrors may also include a circumferential edge, or an edge positioned at the end of a major axis of the curved mirror. In this regard, a mirror may include a radius of curvature, R, including the distance from the vertex to the circumferential edge.

Figure 5B:
FIG. 5*b* is another perspective view of an exemplary implementation mirror.

FIG. 5b is another perspective view an exemplary implementation of SPARC mirrors. In some implementations, a SPARC mirror may include a plurality of consecutively aligned curved mirrors 510 situated on and separable from a low spatial frequency background 328 such that consecutively aligned curved mirrors 510 may form one or more images of direct radiance from the Sun, the images detectable from orbit by a sensor.

Figure 6:
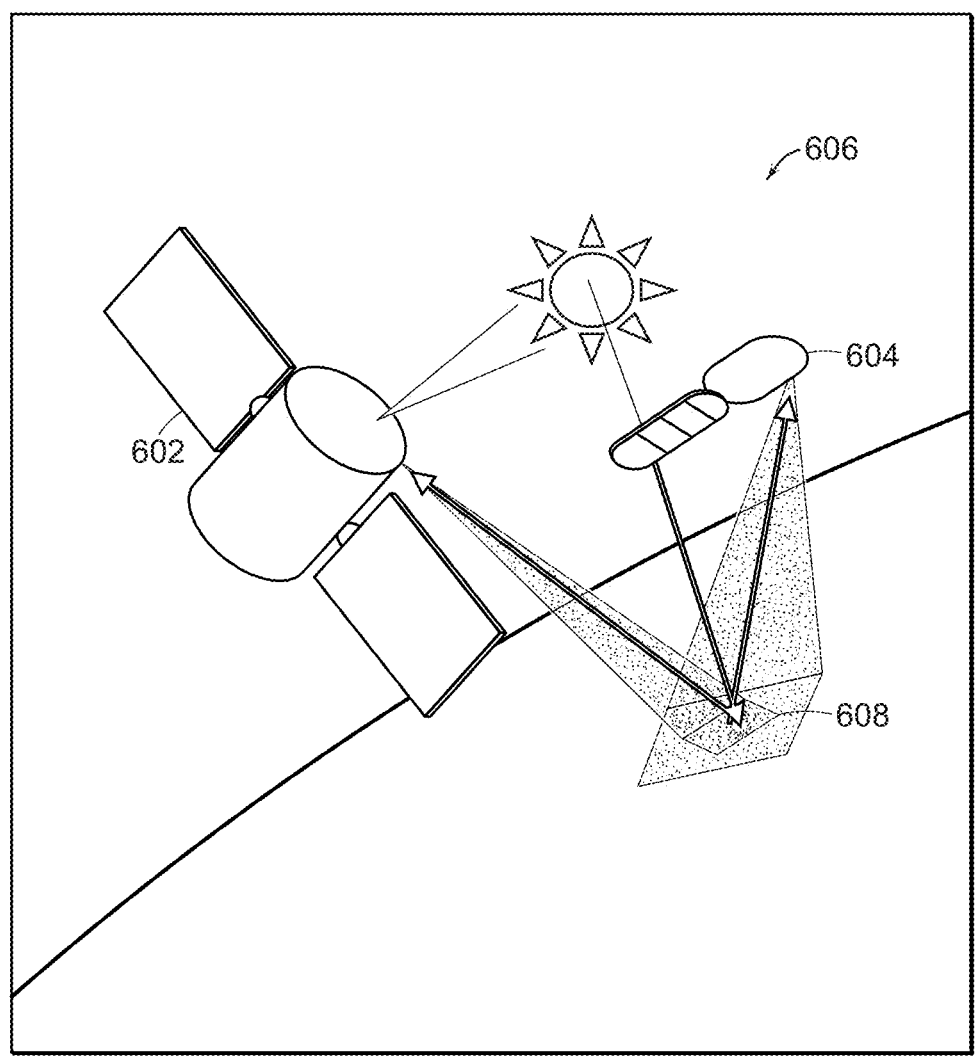
FIG. 6 is a perspective view of an intersensor calibration event, including a constellation of two satellites each detecting a similar image reference target.

FIG. 6 is a perspective view of an intersensor calibration event, including a constellation of two satellites each detecting a similar image reference target. As shown in FIG. 6, satellite intersensor calibration system 600 includes a first satellite 602 and a second satellite 604, examples of which are described herein. In this example, first satellite 602 and second satellite 604 are imaging satellites, configured to collect Earth observation visuals, images, and the like. Satellite 602 and satellite 604 are referring to SPARC target 608 for calibration, methods and systems of which are described herein. In this regard, satellite 602 and satellite 604 may refer to an image or virtual image of star 606 without having to shift respective detector lines of sight toward star 606. As such, satellite 602 and satellite 604 may refer to an absolute solar reference imaged on the Earth simultaneous to or in conjunction with collecting Earth observation visuals, images, and the like. If the images are collected temporally coincident, this would be an illustration of a cross-calibration event. Functionality of the proposed intersensor calibration methodology, however, does not require temporal coincidence.

Figure 7:
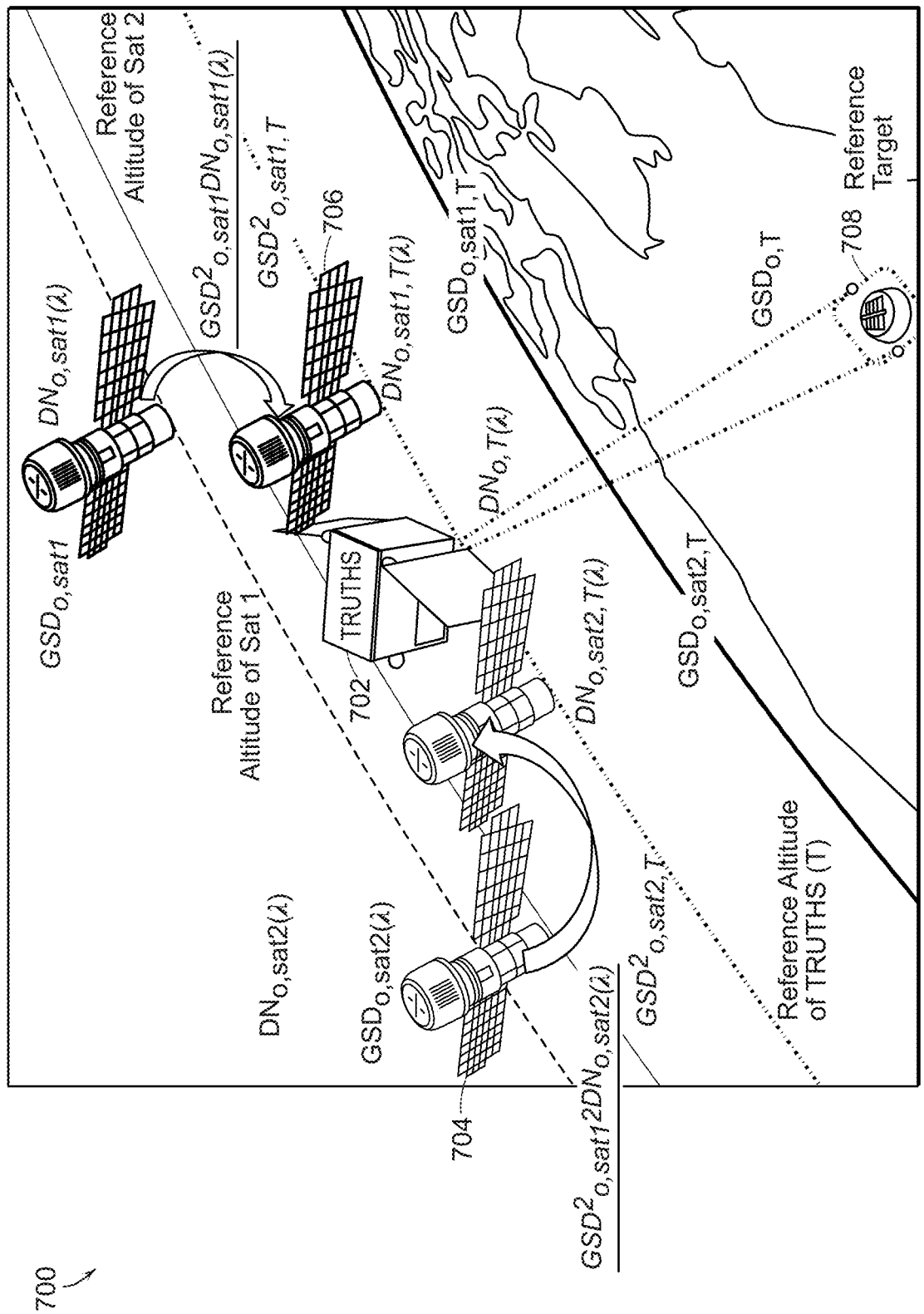
FIG. 7 is another perspective view of an intersensor calibration event, including a constellation of three satellites and one reference target.

FIG. 7 is another perspective view of an intersensor calibration event, including a constellation of three satellites and one reference target. As shown in FIG. 7, the constellation includes three sensors 702, 704, 706 with one being a reference sensor 702 for the constellation, and a SPARC target mirror 708, imaging a reference target. Each of the three sensors 702, 704, 706 may communicate with an intersensor calibrator to separately compute and average digital number responses per mirror in the SPARC target mirror 708 after completing or during overpasses of the SPARC target mirror 708. The $DN_o$ value for the two constellation sensors 704, 706 may be transformed to the $DN_o$ value of the reference sensor's $GSD_o$ using equation 7. The $$\frac{DN_{o,sensor1}(\lambda)}{DN_{o,sensor2}(\lambda)}$$

ratio may thereafter be computed, wherein sensor 2 may be represented as the reference sensor 702. The gain transformation between two sensors 702, 704, 706 may then be computed using equation 10 such that observational data collected by a sensor 702, 704, 706 can be adjusted using the gain transformation between that sensor and the reference sensor.

Elements, equations, or steps of different implementations described may be combined to form other implementations not specifically set forth previously. Elements, equations, or steps may be left out of the systems or processes described previously without adversely affecting their operation or the operation of the system in general. Furthermore, various separate elements, equations, or steps may be combined into one or more individual elements or steps to perform the functions described in this specification. It should be understood by one skilled in the art that equations set forth may herein may be otherwise expressed in a different form or manner with different underlying assumptions, thus not specifically set forth.

Other implementations not specifically described in this specification are also within the scope of the following claims.

What is claimed is:

1. A method for intersensor calibration comprising:
    A. imaging a solar signal using a mirror to create an image reference target;
    B. detecting the image reference target using a first sensor;
    C. generating a zero airmass response constant based on a ground sampling distance of the first sensor and an at-sensor radiance value, the at-sensor radiance value based on an at-sensor, top-of-atmosphere intensity of the image reference target;
    D. computing a radiometric gain coefficient of the first sensor using the zero airmass response constant;
    E. comparing the radiometric gain coefficient of the first sensor to a radiometric gain coefficient of a second sensor to determine a gain ratio between the first sensor and second sensor; and
    repeating steps B-E for a plurality of sensors by comparing the radiometric gain coefficient of each of the plurality of sensors to the radiometric gain coefficient of the second sensor and determining a gain ratio between each of the plurality of sensors to the second sensor, said plurality of sensors including the first sensor.

2. The method of claim 1 wherein the zero airmass response constant is based on a spectral band of the image reference target.

3. The method of claim 2 further comprising repeating step C over a plurality of spectral bands.

4. The method of claim 2 wherein the zero airmass response constant defines an intrinsic response coefficient, or digital number, for each spectral band.

5. The method of claim 1 wherein the zero airmass response constant includes an image point response function of the mirror.

6. The method of claim 1 wherein the mirror includes a convex mirror.

7. The method of claim 1 wherein the mirror includes an array of mirrors.

8. The method of claim 1 wherein the image reference target includes a SPARC target, wherein the SPARC target includes a reflection of a star.

9. The method of claim 1 further comprising measuring solar irradiance using a radiometer and comparing a resulting solar irradiance measurement to the at-sensor radiance value.

10. The method of claim 1 wherein the first or second sensor is located on one or more of the following: airborne vehicle; unmanned aerial vehicle; satellite; drone; ground based facility; or ground based platform.

11. The method of claim 1, wherein the second sensor is a reference sensor for the intersensor calibration of the plurality of sensors.

12. A satellite intersensor calibration system comprising:
    a mirror configured to image a solar signal to: A) produce an image reference target;
    a first sensor configured to: B) detect the image reference target; and
    an intersensor calibration processor arranged to:
        C) generate a zero airmass response constant based on a ground sampling distance of the first sensor;
        D) compute a radiometric gain coefficient of the first sensor using the zero airmass response constant; and
        E) compare the radiometric gain coefficient of the first sensor to a second sensor;
    wherein a plurality of sensors and the intersensor calibration processor respectively repeat steps B-E for the plurality of sensors by comparing the radiometric gain coefficient of each of the plurality of sensors to the radiometric gain coefficient of the second sensor and determining a gain ratio between each of the plurality of sensors to the second sensor, said plurality of sensors including the first sensor.

13. The satellite intersensor calibration system of claim 12 further comprising a satellite including the intersensor calibration processor.

14. The satellite intersensor calibration system of claim 12 further comprising a second intersensor calibration processor.

15. The satellite intersensor calibration system of claim 12, wherein the second sensor is configured to detect the image reference target.

16. The satellite intersensor calibration system of claim 12 wherein the intersensor calibration processor is further arranged to send gain data, or a portion therefore. to one or more of the plurality of sensors.

17. The satellite intersensor calibration system of claim 12 wherein the mirror includes a convex mirror.

18. The satellite intersensor calibration system of claim 12 wherein the mirror includes a plurality of mirrors.

19. The satellite intersensor calibration system of claim 12 further comprising a radiometer to measure a solar irradiance to compare to the at-sensor radiance value.

20. A satellite imaging system comprising:
    a plurality of satellites, each satellite including a senor configured to detect a reference signal from one or more reference image sources, each sensor outputting an at-sensor radiance value associated with each detected reference signal, each sensor outputting image data associated with a detected image;
an intersensor calibrator arranged to:
receive the at-sensor radiance value from each of the plurality of satellites;
generate a zero airmass response constant based on a ground sampling distance of each sensor and the at-sensor radiance value associated with each sensor, the at-sensor radiance value being based on an at-sensor, top-of atmosphere intensity of each of the one or more image reference sources;
determine a radiometric gain coefficient associated with each sensor of the plurality of satellites using the zero airmass response constant associated with each sensor of the plurality of satellites; and
determine a plurality of gain ratios, each gain ratio being based on a comparison of the radiometric gain coefficient of each sensor of the plurality of satellites with a radiometric gain coefficient of a reference sensor; and
an image tracker arranged to:
receive image data from each of the sensors associated with the plurality of satellites;
receive the plurality of gain ratios, wherein each of the plurality of gain ratios corresponds to each of the sensors associated with the plurality of satellites; and
generate calibrated image data associated with each sensor based on adjusting the received image data from each of the sensors associated with the plurality of satellites using a gain ratio corresponding to each sensor.

* * * * *